March 22, 1932. L. JAENICHEN 1,850,628
SCALE
Filed Feb. 21, 1930 3 Sheets-Sheet 2
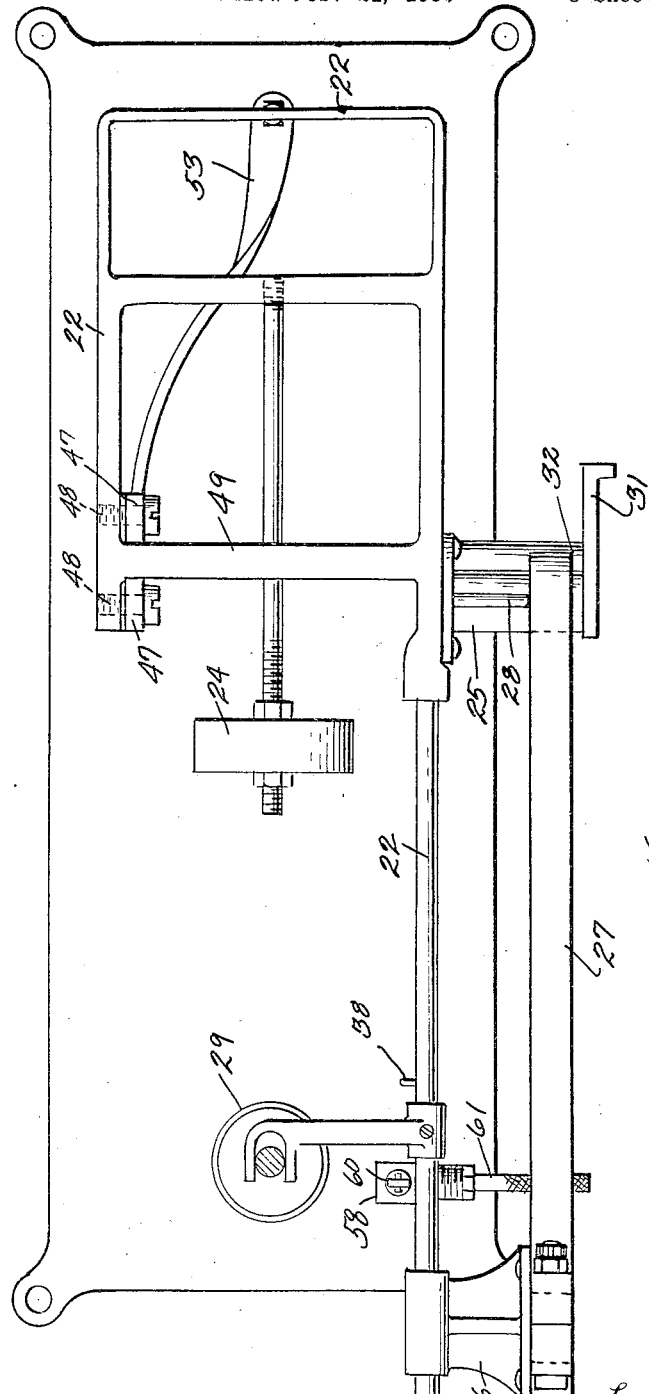
INVENTOR.
Louis Jaenichen
BY
Francis D. Hardesty
ATTORNEY.

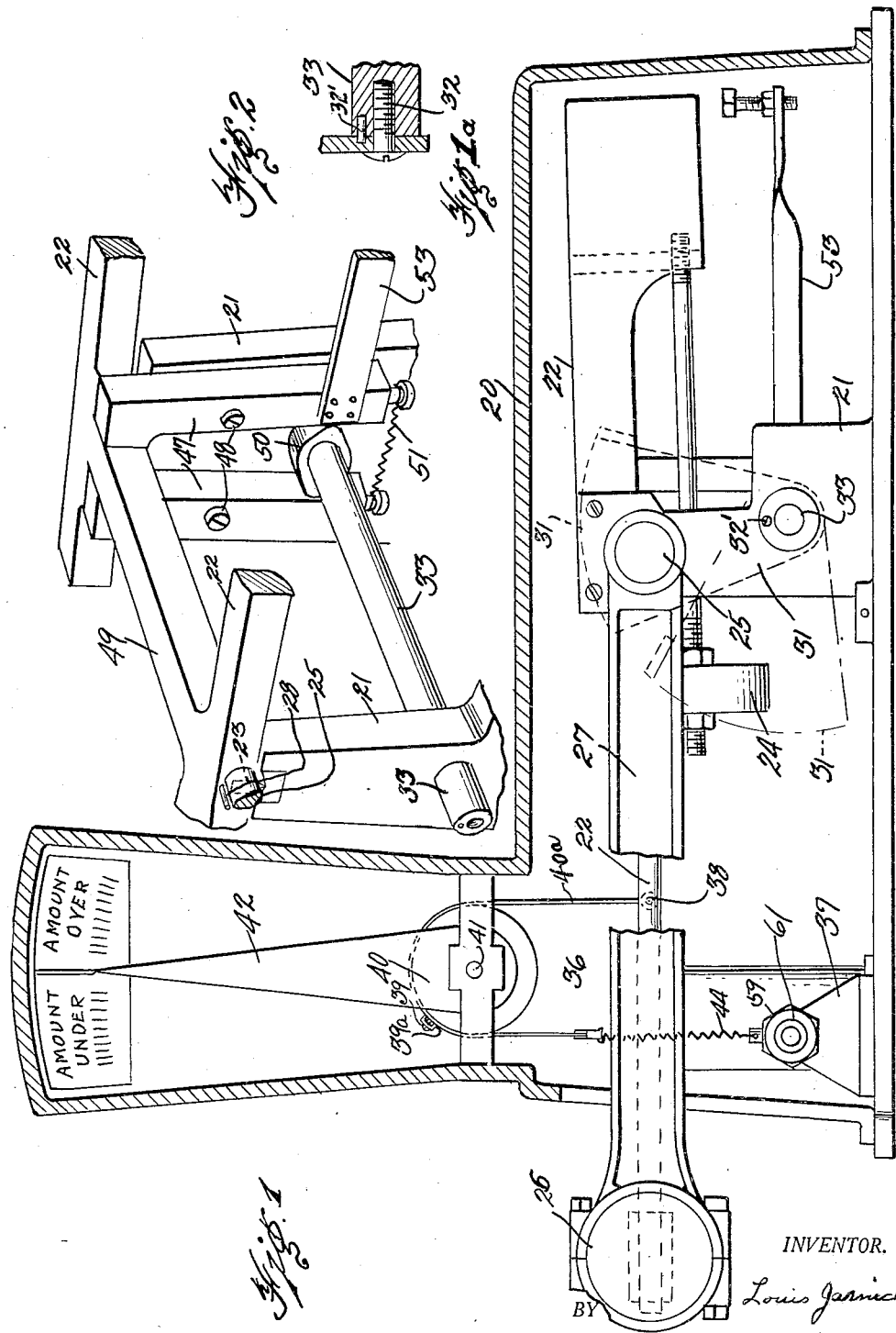

March 22, 1932.  L. JAENICHEN  1,850,628
SCALE
Filed Feb. 21, 1930   3 Sheets-Sheet 3
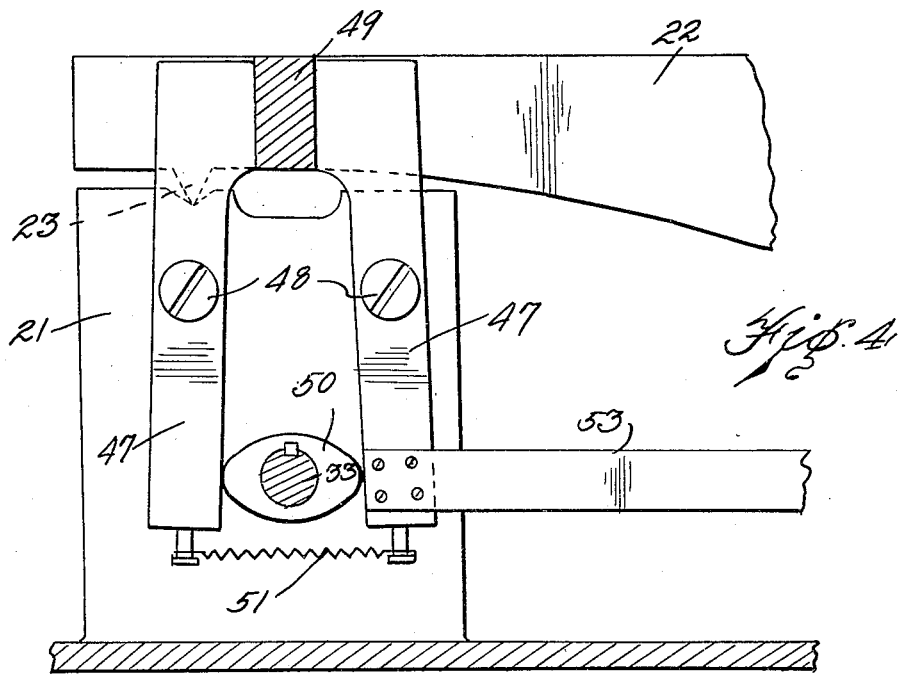
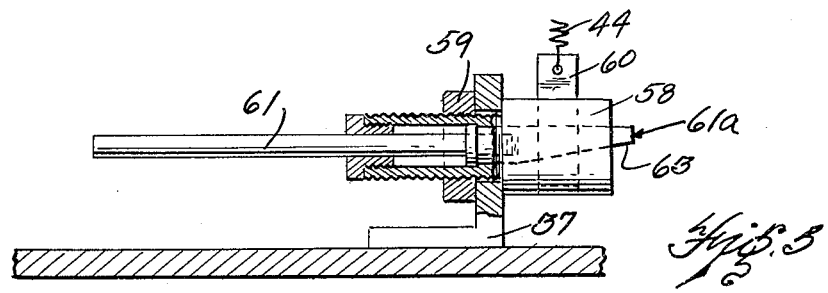
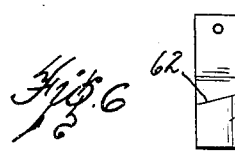
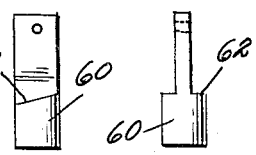
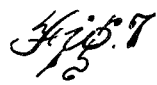
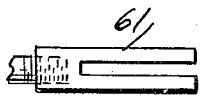
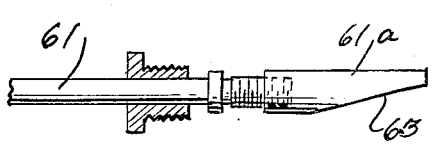
INVENTOR.
Louis Jaenichen
BY Francis D. Hardesty
ATTORNEY.

Patented Mar. 22, 1932

1,850,628

UNITED STATES PATENT OFFICE

LOUIS JAENICHEN, OF SPRINGFIELD TOWNSHIP, OAKLAND COUNTY, MICHIGAN, ASSIGNOR TO THE STANDARD COMPUTING SCALE COMPANY, OF DETROIT, MICHIGAN, A CORPORATION OF MICHIGAN

SCALE

Application filed February 21, 1930. Serial No. 430,192.

This invention relates to weighing mechanisms or scales.

In production work where it is necessary to have parts accurately balanced, it is often desirable to provide a scale for weighing manufactured parts and it is still more desirable to provide a scale which records merely the variations in weight from the normal or desired weight of the manufactured object to be weighed. Similarly, in the packaging of certain commodities, such as food stuffs and the like, it is often desirable to provide a scale which will indicate the amount to be added to or substracted from the package in order to cause it to equal a predetermined standard weight.

It has been found desirable to provide a scale of this character upon which the mechanic can put the article of manufacture and at a glance observe the variation, overweight of underweight, of the article, the mechanic being not at all interested in the total weight of the article.

It is an object, therefore, of the present invention to provide a scale which indicates merely variations from the normal weight of an object to be weighed.

Another object of this invention is to provide a weighing machine having two separate scales operating in tandem so as to form a compound scale.

A further object is to provide a weighing mechanism which is adjusted to a standard or normal weight of the object to be weighed and which will record or indicate variations from that standard.

It is a further object to provide a compound scale in which the scales are adjusted to the normal weight of the device and in which variations only from the normal are recorded, the scales giving a neutral reading when the weight imposed upon the scales is equal to the standard.

A further object is to provide a scale clamping means which serves to prevent movement of the scale except after a load has been applied thereto, the clamping means being releasable after application of load to the scale.

A further object is to provide a clamping device which will stop all excessive movements of the scale parts, thereby causing a gain in weighing time, and prolonging the life of the scale.

It is a further object to provide a spring balance having means for adjusting the tension of the spring contained therein.

A still further object is to provide scales particularly adapted for weighing connecting rods, pistons, and the like.

Still other objects will readily occur to those skilled in the art upon reference to the following description and the accompanying drawings in which Fig. 1 shows partly in section a scale.
Fig. 1a shows a detail thereof.
Fig. 2 is a perspective of a scale clamping mechanism.
Fig. 3 is a plan view of the scale, parts being removed for clarity.
Fig. 4 is a detail view in elevation of the scale clamping mechanism.
Fig. 5 is a view in section of the spring adjuster.
Figs. 6, 7, 8 and 9 show parts of the adjuster in detail.

A specific embodiment of my invention will be best seen in Figs. 1 to 4 inclusive.

In a casing 20 and upon supports 21 is pivotally mounted a scale beam 22 provided with knife edges 23 cooperating with the supports for accurate pivotal movement of the beam. The latter is provided with a counterweight 24 which is movable to adjust the scale and to compensate for the major part of the weight of the object to be weighed, and of the scale beam. The beam is provided with load supports 25 and 26 for receiving the load, in this case a connecting rod 27. A pin 28 prevents excessive inward movement of the connecting rod.

The scale is also provided with the usual dash pot 29 to dampen the operation of the scale.

A shield plate 31 secured by means of a screw 32 and a pin 32' to the axle 33 which rotates in support 21 is disposed in front of the load support 25 where it can cover or uncover the latter.

The construction thus far described constitutes a complete scale and in the normal operation of the latter the counterweight 24 is adjusted so that when a device of the desired weight is applied to the scale, the scale will be in near balance.

It will be obvious, however, that in production work some articles will be overweight and some are apt to be underweight. Accordingly, means are provided for indicating, not the weight of the article, but variations from the desired weight of the article. The last mentioned means comprises a spring balance 36 of a conventional type having one end spring anchored to a zero adjuster, its other end being anchored to the drum 40 by means of clamping screw 39 and clamp 39a. Drum 40 is mounted upon pivots 41 and being provided with an indicator 42 of the usual type. A steel ribbon 40a connects the drum to the beam 22 at the point 38.

It will be seen that the spring balance 36 will record a very small part of the load, the beam itself being balanced by a little less than the standard weight. If the object be of standard weight, the indicator will move to zero position. If the object be overweight, the load end of the beam 22 will be depressed, exerting tension upon the load side of the spring balance, revolving the needle or indicator to the right past the zero point in accordance with the excess weight.

In order to prevent unnecessary movement and jarring of the beam, a beam clamp shown best in Figs. 2 and 4 is provided. The clamp comprises a pair of jaws 47 pivoted at 48 and normally free of the transverse bar 49 of the beam 22. An elongated cam 50 is keyed to the axle 33 and when it is desired to apply a load to the scale, plate 31 is rotated about 90 degrees to the left as in Fig. 1, causing elongated cam 50 to rotate about 90 degrees along with the axle and permitting the spring 51 to free the jaws from bar 49, thus permitting beam 22 to rock upon its knife edges or pivots 23. Until plate 31 is rotated to its proper position, jaws 47 grip the bar 49, thus preventing movement of the latter.

A further means for preventing undue movement of the beam 22 is shown at 53, the latter part comprising an adjustable stop for the right-hand end of the beam, preventing unnecessary tipping of the latter. The stop 53 is rigidly fastened to a jaw 47 and when the latter is in its clamping position, stop 53 is elevated preventing downward movement of the beam. However, when jaw 47 is in its beam freeing position, stop 53 is lowered, permitting movement of the beam.

In order to adjust the tension of the spring balance, a zero adjuster shown best in Figs. 5 to 9 inclusive, is provided. The adjuster includes an L-shaped support 37 having an aperture through which the bearing 58 is threadedly mounted, the nut 59 serving to secure the bearing against the support. Right angularly disposed bores are provided in the bearing, the vertical bore receiving the slide 60 connected to the spring, and the horizontal bore receiving the manually movable forked adjusting rod 61 shown best in Figs. 8 and 9.

The slide 60 and the adjusting rod 61 are provided with cooperating bevels 62 and 63 and movement of the adjusting rod to the right, as in Fig. 5, will cause downward movement of the slide and consequent application of tension to the spring 44, whereas movement of the adjusting rod to the left, as in Fig. 5, permits spring 44 to slacken up, the rod 61 being held in any set position by the friction between it and the remaining parts.

It will, therefore, be seen that I have provided a scale which is responsive only to variations from a standard or normal load weight and which will visually indicate the excess or lack of weight of the object.

It will also be seen that a novel scale beam clamp and a novel spring balance zero adjuster are provided.

It will also be seen that I have provided a scale which is particularly adapted for weighing manufactured articles in production work.

Now having described the invention, and the preferred embodiments thereof, it is to be understood that the said invention is to be limited, not to the specific details herein set forth, but only by the scope of the claims which follow.

Claims:

1. A scale spring adjuster comprising a support, a beveled element connected to the scale spring and mounted so as to be slidable in said support, and an adjusting bolt slidable in said support at right angles to said element and having a bevel cooperating with the bevel on said element to cause reciprocating movement of the latter to exert more or less tension on the spring.

2. A scale spring adjuster comprising a support, beveled engaging elements slidable in said support at right angles to each other, a spring attached to one of said elements, said elements cooperating in a manner such that movement of one causes movement of the other to exert more or less tension on the scale spring.

3. In a scale, a pivotally mounted scale beam or lever, having a cross bar thereon, and means to lock the scale beam against movement, said means comprising a pair of normally open jaws pivotally mounted on opposite sides of said cross bar, means tending to open the jaws, and a cam rotatable between said jaws to cause closing movement of the latter.

4. In a scale, a pivotally mounted scale beam, and means to lock the scale beam against movement, said means comprising a pair of jaws pivotally mounted on opposite sides of a portion of said beam and a cam rotatable between said jaws to cause movement of the latter, and a stop carried by one of said jaws and adapted to engage a portion of the beam to limit the movement thereof even when the jaws are open.

5. In a scale, a pivotally mounted scale lever, and means to lock the scale lever against movement, said means comprising a pair of jaws pivotally mounted on opposite sides of a portion of said beam and a cam rotatable between said jaws to cause movement of the latter, and an adjustable stop carried by one of said jaws and adapted to engage a portion of the beam to limit the movement thereof even when the jaws are open.

6. In a scale, a pivotally mounted scale beam having a cross bar thereon, and means to lock the beam against movement, said means comprising a pair of normally open jaws pivotally mounted on opposite sides of said cross bar, and a cam rotatable between said jaws to cause movement of the latter, and an adjustable stop carried by one of said jaws and adapted to engage a portion of the beam to limit the movement thereof even when the jaws are open.

7. In a weighing mechanism, a pivotally supported scale beam, a load support projecting forwardly from and transverse to the beam so as to support the load in front of the beam, a pair of jaws pivotally mounted on opposite sides of a portion of said beam, means tending to open the jaws, and means to close the jaws to lock the beam against movement.

8. In a weighing mechanism, a pivotally supported scale beam, a load support projecting forwardly from and transverse to the beam so as to support the load in front of the beam, a pair of jaws pivotally mounted in opposite sides of a portion of said beam, means tending to open the jaws, means to close the jaws to lock the beam against movement, and means to cover the load support so as to prevent the application of a load thereon.

9. In a weighing mechanism, a pivotally supported scale beam, a load support projecting forwardly from and transverse to the beam so as to support the load in front of the beam, a pair of jaws pivotally mounted in opposite sides of a portion of said beam, means tending to open the jaws, means to close the jaws to lock the beam against movement, and means to cover the load support so as to prevent the application of a load thereon, and means operatively connecting the jaw closing means with the support covering means so that jaws are open only when the load support is uncovered, and vice versa.

10. In a weighing mechanism, a pivotally supported scale beam, a load support projecting forwardly from and transverse to the beam so as to support the load in front of the beam, a pair of jaws pivotally mounted in opposite sides of a portion of said beam, means tending to open the jaws, means to close the jaws to lock the beam against movement, and means to cover the load support so as to prevent the application of a load thereon, and means operatively connecting the jaw closing means with the support covering means so that jaws are open only when the load support is uncovered, and vice versa, the connecting means including a shaft upon which the jaw closing means and the load support covering means are fixedly mounted.

LOUIS JAENICHEN.